United States Patent Office 2,735,757
Patented Feb. 21, 1956

2,735,757

MANUFACTURE OF IRON POWDER

Heinz Georg Gerhard Zapf, Huskvarna, Sweden, assignor to Husqvarna Vapenfabriks Aktiebolag, Huskvarna, Sweden, a corporation of Sweden No Drawing. Application January 27, 1953, Serial No. 333,609

Claims priority, application Sweden January 29, 1952

5 Claims. (Cl. 75—.5)

For the powder metallurgical production of machine parts and similar products large quantities of iron powder are needed. The same must fulfill a row of requirements in order to satisfy all demands as to its workability by pressing and sintering as well as to the quality of the products produced. The workability by pressing is primarily determined by the shape, size and micro-porosity of the powder particles which entail certain powder characteristics, such as apparent density, flow rate, tap density, compressibility and green strength, the latter being particularly important. A good green strength is obtained, if the powder has a relatively low apparent density of, for instance, 2.2–2.8 g./cm.$^3$ and such a favourable compressibility that a compact having a density of 6.8 is obtained when using a specific pressure of 6 t./cm.$^2$. For the behaviour of the powder at the sintering treatment and for the quality of the sinter products the fineness (particle size distribution) of the powder and its degree of purity are of decisive importance. Particularly desirable are powders having a maximum particle size of 0.20 mm., a fraction of at least 70% below 0.15 mm., and a fraction of at least 30% below 0.06 mm. As to the purity degree it is particularly desirable that the content of difficultly or unreducible substances, such as certain oxides and silicates, is low, preferably below 0.1%.

The present invention has for its object to provide a method making it possible at low cost to produce an iron powder substantially fulfilling the above specified requirements. According to this method a solution containing iron in the form of 2- or 3-valent iron ions, preferably an iron chloride solution, is oxidized by means of air so as to precipitate iron therefrom in the form of a hydrate sludge, which is separated from the solution, washed, dried and reduced to iron powder. The process is carried out as a circle process, the separated solution being regenerated as to its iron content, under dissolution of iron scrap, and thereupon oxidized again. Hydrogen formed at the preparation of the solution is used to advantage as reducing agent in the reduction of the dried hydrate sludge. Instead of a chloride solution it is possible, though to less advantage, also to use for instance a bromide or iodide solution. A process according to the invention will be more closely described in the following.

An iron solution having a content of 20–200, suitably at least 50 g. iron per litre solution, is prepared by dissolving in hydrochloric acid iron scrap, suitably turning or drilling chips, which material is difficult economically to utilize otherwise. The preparation of the solution will be best performed at an elevated temperature, preferably 70–90° C., but also lower temperatures may be used. At the end of the dissolving process the solution should have a pH-value of 4.5–6.8, preferably about 6.4.

After the dissolving process has been finished, the solution is, if necessary, freed from solid impurities, for instance by filtration or centrifuging. Thereupon a vigorous air current is blown into the solution, whereby a portion of the iron precipitates in the form of a finely dispersed hydrate, mainly ferric hydrate. The precipitation is finished when the pH-value of the solution has dropped to about 2 (1.8–2.2). During the precipitation the solution is preferably kept at an elevated temperature, preferably above 45° C. or better, above 60° C., whereby the precipitation process is accelerated and the hydrate may be obtained in a form more easy to filtrate. The hydrate sludge is then separated from the solution, for instance by filtration, centrifuging or the like, whereupon it is washed, dried and reduced to iron powder.

The reduction is performed in a plurality of steps. One may thus subject the hydrate to a first reduction at 500–600° C. with hydrogen or a carbonaceous reducing gas, such as producer gas or propane, comminute the reduction product and thereupon subject it to a second reduction with the same kind of reducing gas at 800–1000° C,. preferably 850° C., comminute again and perform a final reduction with hydrogen at 800–1000° C., preferably about 950° C. However, one may also dispense with the second one of the above-mentioned reductions, thus performing the final reduction with hydrogen in succession to the pre-reduction. If it is desired to produce an extremely fine-grained powder suitable for certain special powder metallurgical products, such as mass cores, both or all reductions, respectively, may be performed at lower temperature, for instance 400–600° C. For the production of a coarse-grained powder both or all reductions, respectively, may be performed at 800–1000° C., the choice of reduction conditions constituting, on the whole, a means for regulating the particle size.

The filtered solution is again brought into contact with iron chips or other iron scrap, preferably at the temperature used in the preparation of the solution. Hereby the solution is regenerated as to its iron content and its pH-value. The dissolution of iron takes place under hydrogen evolution. The hydrogen gas may be collected and utilized for reduction of the iron hydrate, whereas the regenerated solution serves the purpose of precipitating further hydrate sludge. This hydrate obtaining process thus constitutes a circle process with alternating oxidation and regeneration of an iron solution, in which iron is supplied and hydrogen is obtained on one side, and oxygen is supplied an iron hydrate is obtained on the other side.

The mode of drying and dewatering the hydrate forms a further possibility of influencing particle shape and particle size distribution. It is thus possible to obtain a denser, less porous powder if the hydrate is dewatered at higher temperature (above 400° C.) or, after dewatering, is annealed in a neutral or oxidizing atmosphere at higher temperature, for instance 800–1000° C. After the reduction one then obtains a product which has a relatively high apparent density of 2.9–3.5 and which is well suited for certain special purposes, such as fabrication of pole shoes.

What I claim is:

1. A method of producing iron powder, comprising the steps of preparing an aqueous haloid salt solution containing iron ions, oxidizing said solution by means of air so as to precipitate iron therefrom in the form of a hydrate sludge, separating said sludge and said solution, washing and drying said sludge and thereupon reducing the same to iron powder by means of a gaseous reducing agent and in a plurality of stages, at least the last one of said stages being carried out in hydrogen, regenerating said separated solution as to its iron content by dissolving iron scrap therein, and thereupon again oxidizing said solution, said oxidizing and regenerating steps forming a cycle of operations.

2. A method according to claim 1, wherein hydrogen evolved when regenerating said solution is used as reducing agent when reducing said sludge to iron powder.

3. A method of producing iron powder, comprising the steps of preparing an aqueous haloid salt solution containing iron ions and having a pH-value of 4,5–6,8, oxidizing said solution by blowing an air current into the same so as to precipitate iron therefrom in the form of a hydrate sludge, separating said sludge and said solution, washing, drying and reducing said sludge to iron powder by means of a gaseous reducing agent and in a plurality of stages, at least the last one of said stages being carried out in hydrogen, regenerating said separated solution as to its iron content by dissolving iron scrap therein at an elevated temperature, and thereupon again oxidizing said solution.

4. A method according to claim 3, wherein said oxidations are performed at a temperature above 45° C.

5. A method of producing iron powder, comprising the steps of preparing an iron chloride solution having an iron content of 20–200 grams per litre and a pH-value of 4,5–6,8, precipitating iron hydrate from said solution by means of air until said pH-value has dropped to 1,8–2,2, separating said hydrate and said solution, washing and drying said hydrate and thereupon reducing the same to iron powder by means of a gaseous reducing agent and in a plurality of stages, the solid reduction product being comminuted between consecutive stages, at least the last one of said stages being carried out in hydrogen and at a temperature of 800–1000° C., and regenerating said separated solution as to its iron content by dissolving iron scrap therein at an elevated temperature, said precipitating and regenerating steps forming a cycle of iron hydrate recovering operations.

References Cited in the file of this patent

UNITED STATES PATENTS 1,829,635   Davey _____ Oct. 27, 1931

OTHER REFERENCES

Comprehensive Treatise On Organic and Theoretical Chemistry, vol. 14, page 72. Edited by Mellor. Pub. in 1935 by Longmans, Green and Co., New York.